(12) United States Patent
Liu et al.

(10) Patent No.: US 10,082,608 B2
(45) Date of Patent: Sep. 25, 2018

(54) PRISM GROUP AND DISPLAY APPARATUS USING THE SAME

(71) Applicant: Young Lighting Technology Inc., Hsin-Chu (TW)

(72) Inventors: Chin-Ku Liu, Hsin-Chu (TW); Fa-Chih Liu, Hsin-Chu (TW); Jhong-Hao Wu, Hsin-Chu (TW)

( * ) Notice: Subject to any disclaimer, the term of this patent is extended or adjusted under 35 U.S.C. 154(b) by 11 days.

(21) Appl. No.: 15/589,993

(22) Filed: May 8, 2017

(65) Prior Publication Data
US 2018/0136374 A1 May 17, 2018

(30) Foreign Application Priority Data

Nov. 11, 2016 (TW) .............................. 105217241 U

(51) Int. Cl.
| | |
|---|---|
| G02B 5/04 | (2006.01) |
| G02F 1/1333 | (2006.01) |
| G02F 1/1335 | (2006.01) |
| G02B 5/02 | (2006.01) |
| G02F 1/00 | (2006.01) |
| G02F 1/01 | (2006.01) |

(52) U.S. Cl.
CPC ........... *G02B 5/045* (2013.01); *G02B 5/0231* (2013.01); *G02B 5/0278* (2013.01); *G02B 5/0284* (2013.01); *G02F 1/0045* (2013.01); *G02F 1/0105* (2013.01); *G02F 1/133308* (2013.01); *G02F 1/133524* (2013.01); *G02F 2001/13332* (2013.01)

(58) Field of Classification Search
CPC ........ G02B 5/04; G02B 5/045; G02B 17/002; G02B 17/086; G02B 6/0053; G02B 6/0078; G02B 6/0088; G02B 5/0278; G02B 5/0284; G02B 5/0231; G02F 1/133308; G02F 1/1335; G02F 1/1336; G02F 1/0105; G02F 1/0045
USPC ........................................................ 359/831
See application file for complete search history.

(56) References Cited

U.S. PATENT DOCUMENTS

| | | | |
|---|---|---|---|
| 7,554,628 B2 | 6/2009 | Mitani et al. | |
| 9,395,472 B2 * | 7/2016 | Kim ...................... | G02B 5/045 |
| 9,612,468 B1 | 4/2017 | Liu et al. | |

(Continued)

FOREIGN PATENT DOCUMENTS

| | | |
|---|---|---|
| CN | 101593473 A | 12/2009 |
| CN | 102193195 A | 9/2011 |

(Continued)

*Primary Examiner* — Euncha Cherry

(57) ABSTRACT

A prism group, configured to cover a portion of a visible area and a portion of a non-visible area of a display module, includes a first prism and a second prism. The first prism disposed on the visible area includes a main body and a platform. The main body has a first light incident surface, a first light emitting surface and a first inclined surface. The first light incident surface faces to the visible area. The first light emitting surface is nearby the non-visible area and connected to the first light incident surface. The first inclined surface is connected between the first light incident surface and the first light emitting surface. The platform is opposite to the non-visible area and connected to the first light emitting surface. The second prism is disposed between the non-visible area and the platform. A display device having the prism group is also provided.

18 Claims, 7 Drawing Sheets

(56) References Cited

U.S. PATENT DOCUMENTS

| | | |
|---|---|---|
| 2004/0071417 A1 | 4/2004 | Veligdan |
| 2005/0248961 A1 | 11/2005 | Kazuhiro et al. |
| 2010/0238090 A1 | 9/2010 | Pomerantz et al. |
| 2010/0259566 A1 | 10/2010 | Watanabe |
| 2011/0242686 A1 | 10/2011 | Watanabe |
| 2015/0091833 A1 | 4/2015 | Wu |
| 2015/0116852 A1 | 4/2015 | Kim et al. |
| 2016/0062163 A1 | 3/2016 | Lee et al. |
| 2017/0322351 A1 | 11/2017 | Liu et al. |

FOREIGN PATENT DOCUMENTS

| | | |
|---|---|---|
| CN | 101206327 B | 11/2011 |
| CN | 102854644 A | 1/2013 |
| CN | 202794587 U | 3/2013 |
| CN | 203882090 U | 10/2014 |
| CN | 104950504 A | 9/2015 |
| CN | 103700323 B | 12/2015 |
| JP | S60242424 A | 12/1985 |
| JP | 2008060061 A | 3/2008 |
| KR | 20090089727 A | 8/2009 |
| KR | 101178634 B1 | 8/2012 |
| TW | 201403177 A | 1/2014 |
| TW | 201405171 A | 2/2014 |
| TW | 201432331 A | 8/2014 |
| TW | 201432639 A | 8/2014 |
| TW | 201512740 A | 4/2015 |
| TW | 201513069 A | 4/2015 |
| TW | 201513070 A | 4/2015 |
| WO | 2013055852 A1 | 4/2013 |

\* cited by examiner

PRISM GROUP AND DISPLAY APPARATUS USING THE SAME

CROSS-REFERENCE TO RELATED APPLICATION

This application claims the priority benefit of Taiwan Patent Application No. 105217241, filed on Nov. 11, 2016. The entirety of the above-mentioned patent application is hereby incorporated by reference herein and made a part of this specification.

FIELD OF THE INVENTION

The invention relates to a display apparatus, and more particularly to a prism group for a display apparatus and a display apparatus having the prism group.

BACKGROUND OF THE INVENTION

Compared to the conventional cathode ray tube display apparatus, the liquid crystal display apparatus has advantages of thin thickness and light weight, and thus, the liquid crystal display apparatus has replaced the conventional cathode ray tube display apparatus and become a mainstream display apparatus. The liquid crystal display apparatus includes a liquid crystal display panel and a backlight module, wherein the backlight module is used to provide a backlight source to the liquid crystal display panel, and the liquid crystal display panel is used to convert the backlight source to an image frame.

The conventional liquid crystal display panel includes a visible area and a non-visible area around the visible area. In the conventional liquid crystal display apparatus, a frame is used to assemble and fix the liquid crystal display panel and the backlight module, and cover the non-visible area of the liquid crystal display panel. However, the frame surrounding the liquid crystal display panel is a non-visible area of the liquid crystal display apparatus. In recent years, although the width of the non-visible area of the liquid crystal display apparatus has been significantly reduced, the non-visible area of the liquid crystal display apparatus still exists.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a display apparatus to eliminate the non-visible area of the conventional display apparatus.

The invention further provides a prism group for a display apparatus to eliminate the non-visible area of the display apparatus.

Other advantages and objects of the invention may be further illustrated by the technical features broadly embodied and described as follows.

In order to achieve at least one or a portion of or all of the objects or other objects, an embodiment of the invention provides a display apparatus including a display module and at least one prism group. The display module has a visible area and a non-visible area around the visible area. The at least one prism group is disposed on at least one side of the display module and covers a portion of the visible area and a portion of the non-visible area. Each the prism group includes a first prism and a second prism. The first prism is disposed on the visible area and has a main body and a platform connected to the main body. The main body has a first light incident surface, a first light emitting surface and a first inclined surface. The first light incident surface faces to the visible area and is connected the visible area. The first light emitting surface is connected to the first light incident surface and nearby the non-visible area. The first inclined surface is connected between the first light incident surface and the first light emitting surface. The platform is opposite to the non-visible area and connected to the first light emitting surface. The second prism is disposed between the non-visible area and the platform, wherein the second prism has a second light incident surface, a second light emitting surface and a second inclined surface. The second light incident surface faces to the first light emitting surface, the second light emitting surface faces to the platform, and the second inclined surface is connected between the second light incident surface and the second light emitting surface.

In order to achieve at least one or a portion of or all of the objects or other objects, an embodiment of the invention provides a prism group configured to be disposed on a side of a display module having a visible area and a non-visible area around the visible area to cover a portion of the visible area and a portion of the non-visible area. The prism group includes a first prism and a second prism. The first prism is configured to be disposed on the visible area, wherein the first prism has a main body and a platform connected to the main body. The main body has a first light incident surface, a first light emitting surface and a first inclined surface, the first light incident surface faces to the visible area, the first light emitting surface is connected to the first light incident surface and nearby the non-visible area, and the first inclined surface is connected between the first light incident surface and the first light emitting surface. The platform is opposite to the non-visible area and connected to the first light emitting surface. The second prism is configured to be disposed between the non-visible area and the platform, wherein the second prism has a second light incident surface, a second light emitting surface and a second inclined surface. The second light incident surface faces to the first light emitting surface, the second light emitting surface faces to the platform, and the second inclined surface is connected between the second light incident surface and the second light emitting surface.

In the embodiments of the invention, the prism group is disposed on at least one side of the display module, and the prism group has the first prism and the second prism. The first prism is disposed on the visible area of the display module, and the second prism is disposed between the non-visible area of the display module and the platform of the first prism. Due to this configuration, after light rays from the visible area enter into the first prism, portions of the light rays are reflected from the first inclined surface to pass through the first light emitting surface of the first prism and the second light incident surface of the second prism, and then are reflected from the second inclined surface to pass through the second light emitting surface and the platform. Therefore, the light rays from the visible area of the display module may be guided to emit from the non-visible area by the prism group, so as to eliminate the non-visible area of the conventional display apparatus. Since the display apparatus of the embodiment of the invention includes the prism group, a non-visible area of the display apparatus may be eliminated.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1A:
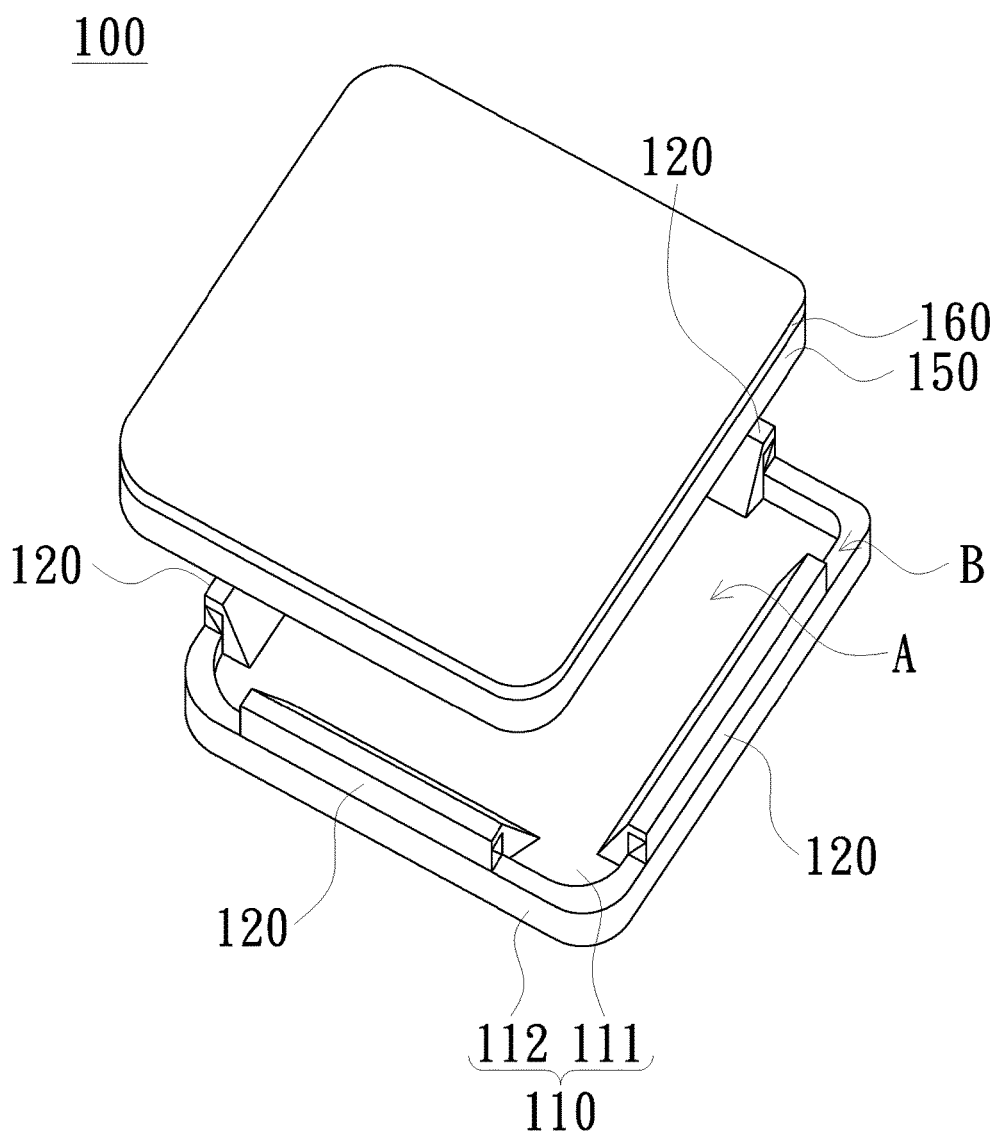
FIG. 1A is a schematic partial exploded view of a display apparatus according to an embodiment of the invention.

FIG. 1A is a schematic partial exploded view of a display apparatus according to an embodiment of the invention. Referring to FIG. 1A, the display apparatus 100 of the embodiment includes a display module 110 and at least one prism group 120. In FIG. 1A, four prism groups 120 are shown as an example. The display module 110 has a visible area A and a non-visible area B around the visible area A. The at least one prism group 120 is disposed on at least side of the display module 110. In FIG. 1A, the four prism groups 120 are respectively disposed at four sides of the display module 110. Each prism group 120 covers a portion of the visible area A and a portion of the non-visible area B. Moreover, the display module 110 of the embodiment may include a display panel 111 and a frame 112 surrounding the display panel 111, wherein the frame 112 corresponds to the non-visible area B. Furthermore, in the embodiment, there is a gap between each two adjacent prism groups 120, and the gap corresponds to a corner of the visible area A. The quantity of the prism groups 120 and the location of the gap are not limited in the invention. In the embodiment, the display module 110 is, for example, a liquid crystal display. In other embodiments, the display module 110 may be other types of displays such as an organic light emitting display, an electronic paper display or a light emitting diode display.

Figure 2:
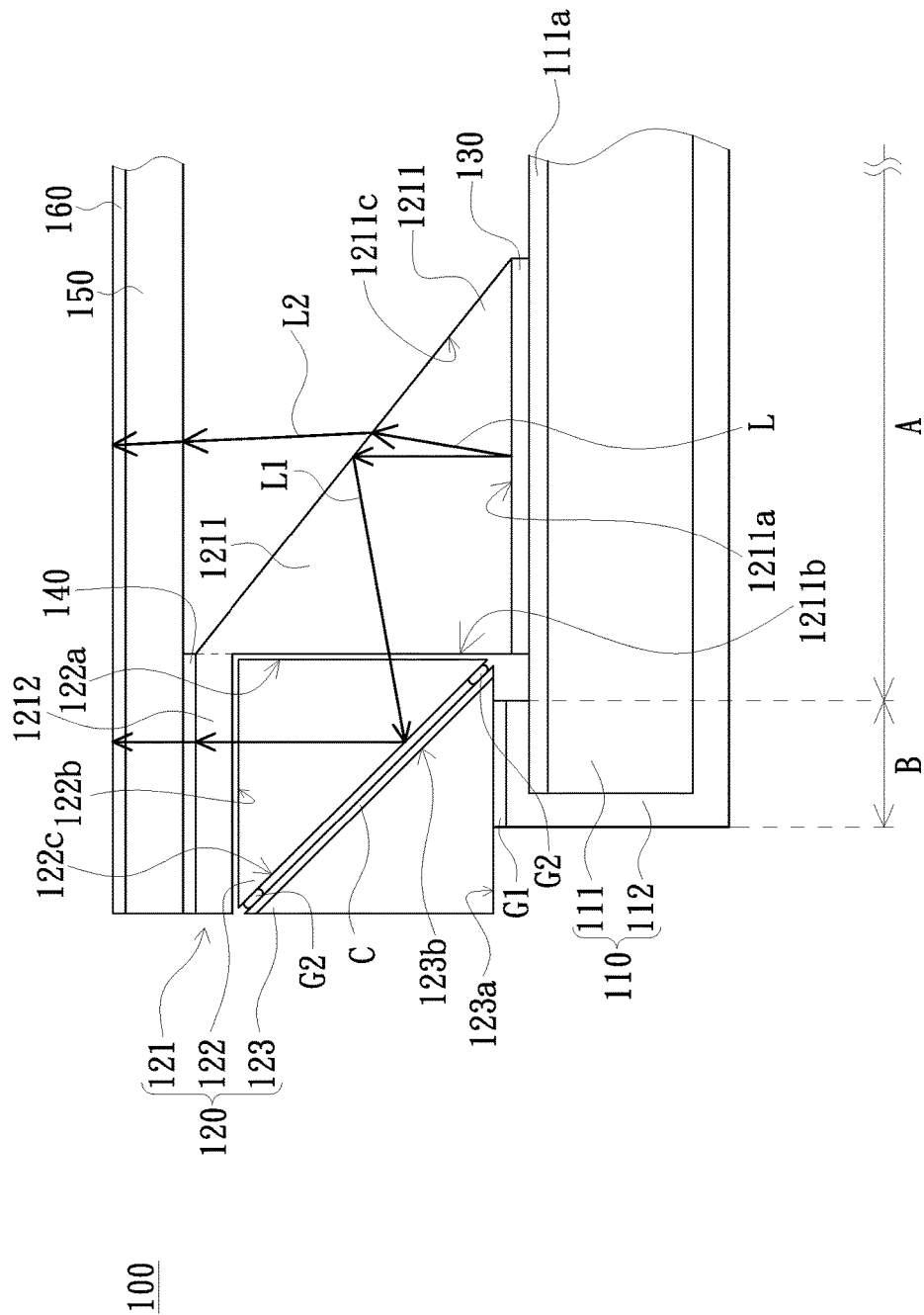
FIG. 2 is a schematic partial cross-sectional view of the display apparatus of FIG. 1A and further shows optical paths.

FIG. 2 is a schematic partial cross-sectional view of the display apparatus of FIG. 1A and further shows optical paths. Referring to FIG. 2, each prism group 120 includes a first prism 121 and a second prism 122. The first prism 121 is configured to be disposed on the visible area A, and has a main body 1211 and a platform 1212 connected to the main body 1211. The main body 1211 has a first light incident surface 1211a, a first light emitting surface 1211b and a first inclined surface 1211c. The first light incident surface 1211a faces to the visible area A, the first light emitting surface 1211b is connected to the first light incident surface 1211a and nearby the non-visible area B. The first inclined surface 1211c is connected between the first light incident surface 1211a and the first light emitting surface 1211b. The platform 1212 is opposite to the non-visible area B and connected to the first light emitting surface 1211b, that is, the platform 1212 is protruded from the first light emitting surface 1211b. The first light incident surface 1211a is, for example, connected to the visible area A. More specifically, the display apparatus 100 of the embodiment may further include a first optical clear adhesive layer 130. The first optical clear adhesive layer 130 is adhered between the first light incident surface 1211a and the visible area A to fix the main body 1211 of the first prism 121 to the display panel 111. The first optical clear adhesive layer 130 is, for example, an optical clear adhesive tape. In another embodiment, the first optical clear adhesive layer 130 may be liquid glue.

The second prism 122 is disposed between the non-visible area B and the platform 1212, and has a second light incident surface 122a, a second light emitting surface 122b and a second inclined surface 122c. The second light incident surface 122a faces to the first light emitting surface 1211b, the second light emitting surface 122b faces to the platform 1212, and the second inclined surface 122c is connected between the second light incident surface 122a and the second light emitting surface 122b. The specific shape of the second prism 122 of the embodiment is not limited to FIG. 2. In the embodiment, the second light incident surface 122a is, for example, nearby the first light emitting surface 1211b, and there is a gap between the second light incident surface 122a and the first light emitting surface 1211b. The second light emitting surface 122b is, for example, nearby the platform 1212, and there is a gap between the platform 1212 and the second light emitting surface 122b.

Refractive indexes of the first prism 121 and the second prism 122 may be the same or different. In an embodiment that the first prism 121 and the second prism 122 have the same refractive index, the first prism 121 and the second prism 122 may be made of a same material. For example, the material of the first prism 121 and the material of the second prism 122 may be, but not limited to, polymethylmethacrylate (PMMA), polycarbonate (PC) or glass.

In the embodiment, the light rays L from the visible area A of the display module 110 pass through the first light incident surface 1211a, and then transmit to the first inclined surface 1211c. Due to different incident angles, one portion of the light rays L (e.g. a light ray L1) is reflected from the first inclined surface 1211c and then passes through the first light emitting surface 1211b, and another portion of the light rays L (e.g. a light ray L2) passes through the first inclined surface 1211c to be received by user's eyes. Moreover, the light ray L1 passing through the first light emitting surface 1211b passes through the second light incident surface 122a and is reflected from the second inclined surface 122c to pass through the second light emitting surface 122b and the platform 1212 in sequence to be received by user's eyes. Since the light ray L1 emits from the non-visible area B, the non-visible area B may display image. Therefore, the non-visible area of the conventional display apparatus may be eliminated, and overall visual experience may be improved.

Referring to FIG. 2 again, the prism group 120 may further include a third prism 123 disposed between the non-visible area B and the second inclined surface 122c of the second prism 122. The third prism 122 may have a connection surface 123a and a third inclined surface 123b. The connection surface 123a is connected to the non-visible area B. The third inclined surface 123b inclined with respect to the connection surface 123a is connected to the connection surface 123a and opposite to the second inclined surface 122c. The specific shape of the third prism 123 is not limited to FIG. 2. The connection surface 123a is, for example, connected to the frame 112 located on non-visible area B. More specifically, the third prism 123 may be fixed to the frame 112 through an adhesive layer G1. Moreover, the second inclined surface 122c is, for example, partially connected to the third inclined surface 123b to be fixed to the third prism 123. More specifically, the second inclined surface 122c may be partially adhered to the third inclined surface 123b through an adhesive layer G2. The adhesive layer G1 or the adhesive layer G2 may be, but not limited to, adhesive type or liquid glue. Furthermore, the third prism 123 not only may be used to fix the second prism 122, but also may have a reflective layer C on the third inclined surface 123b to reflect the light ray which is not totally reflected from the second inclined surface 122c to reduce light loss.

In FIG. 2, the frame 112 is protruded from a display surface, facing to the prism group 120, of the display panel 111. In another embodiment, the frame 112 may be not protruded from the display surface of the display panel 111. The connection surface 123a of the third prism 123 and the first light incident surface 1211a of the first prism 121 may be located on a same reference plane.

Figure 1B:
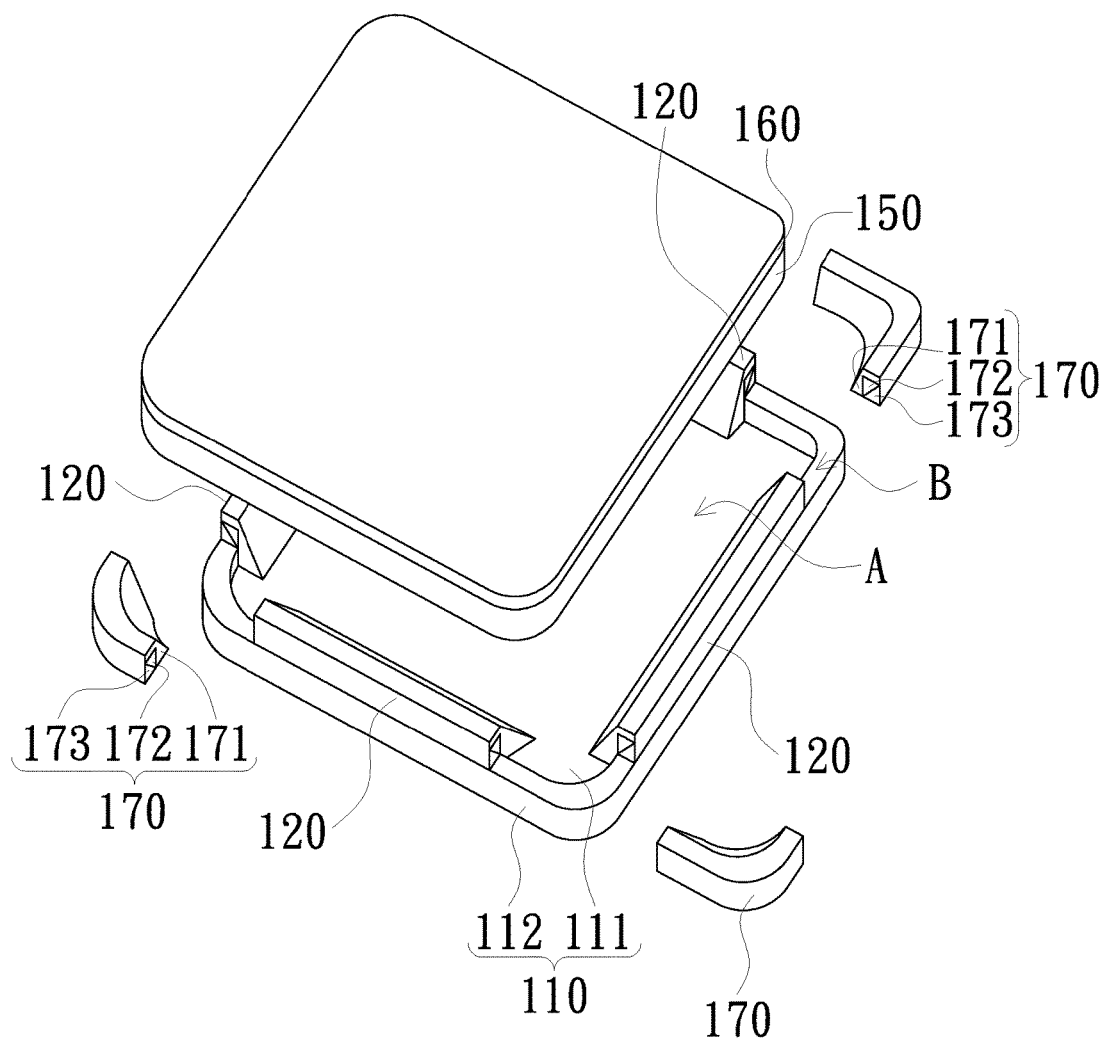
FIG. 1B is a schematic partial exploded view of a display apparatus according to another embodiment of the invention.
Figure 1C:
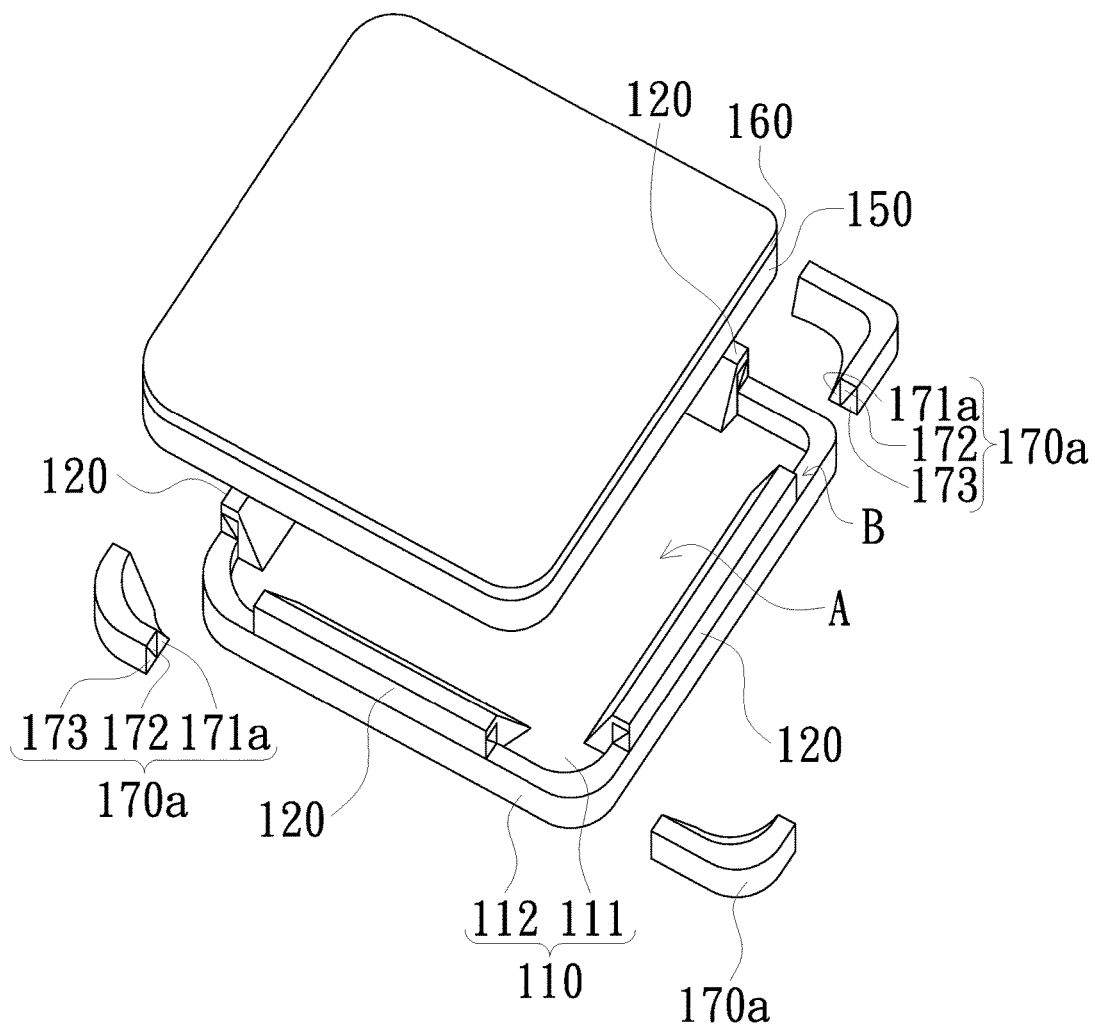
FIG. 1C is a schematic partial exploded view of a display apparatus according to another embodiment of the invention.

Further, in FIG. 1A, a corner prism group may be disposed between two adjacent prism groups 120 to eliminate the non-visible area B on the corner and enable the non-visible area B on the corner to display image. For example, referring to FIG. 1B, a structure of a corner prism group 170 of a display apparatus 100a is similar to that of the prism group 120. The corner prism group 170 includes a fourth prism 171 similar to the first prism 121, and a fifth prism 172 similar to the second prism 122. The fourth prism 171 and the fifth prism 172 are bent along the corner of the display module 110. In this way, the light ray L1 may emit from the non-visible area B on the corner, so the non-visible area B on the corner may display image. Besides, the corner prism group 170 may further include a sixth prism 173 similar to the third prism 123 to fix the fifth prism 172 thereon. The sixth prism 173 is, for example, bent along the corner of the display module 110. Moreover, the sixth prism 173 may have a reflective layer similar to the reflective layer C of FIG. 2 to reduce light loss. In another embodiment, referring to FIG. 1C, a fourth prism 171a of a corner prism group 170a of a display apparatus 100b may not have a platform similar to the platform 1212 of FIG. 2. More specifically, since the corner prism group is bent along the corner of the display module 110, manufacturing difficulty of the corner prism group 170a may be reduced by omitting the platform similar to the platform 1212 of FIG. 2. In other embodiments, any one of the above-mentioned corner prism groups may be, but not limited to, integrated into one piece with at least one adjacent prism group. In another embodiment, all the corner prism groups and the prism groups may be integrated into one piece to form a rectangular band shape.

Referring to FIG. 1A and FIG. 2, the display apparatus 100 of the embodiment may further include a protective cover 150 connected to each platform 1212 and covering the platform 1212 and the visible area A, wherein the protective cover 150 may be made of transparent material such as glass or transparent resin to allow the light rays L1, L2 to pass through. Moreover, the display apparatus 100 may further include a second optical clear adhesive layer 140 adhered between the platform 1212 and the protective cover 150. The second optical clear adhesive layer 140 and the first optical clear adhesive layer 130 may be made of the same material or different materials. In this way, since the protective cover 150 is fixed to the platform 1212 of the first prism 121 and the main body 1211 of the first prism 121 is firmly fixed to the display panel 111, even if the display apparatus 100 is stood up with the protective cover 150 being perpendicular to the ground, the protective cover 150 is not easily fallen off. In another embodiment, when the protective cover 150 is applied to FIG. 1B, the protective cover 150 may be connected to the platform of the corner prism group 170.

Moreover, the display apparatus 100 may further include a first polarization sheet 160 covering the protective cover 150. The first polarization sheet 160 is used to improve the glare problem of the display panel 111. In one embodiment, the first polarization sheet 160 may be a glossy polarization sheet. Furthermore, in the embodiment that the display apparatus 100 includes the first polarization sheet 160, the first optical clear adhesive layer 130 and the second optical clear adhesive layer 140 may be made of the material, which does not affect the polarization directions of the light rays, to avoid affecting the display quality. For example, the first optical clear adhesive layer 130 and the second optical clear adhesive layer 140 may be optical clear adhesive types.

Figure 3:
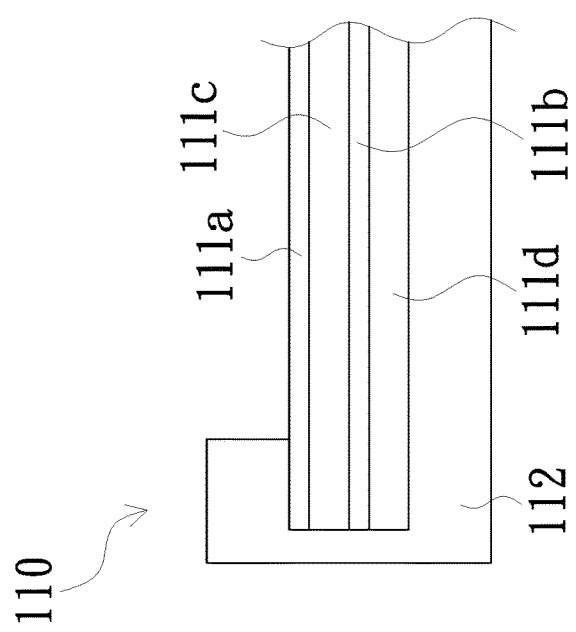
FIG. 3 is a schematic partial cross-sectional view of a liquid crystal display panel according to another embodiment of the invention.

In one embodiment, the display panel 111 may further include the second polarization sheet 111a to improve the glare problem, wherein the second polarization sheet 111a and the first polarization sheet 160 have the same polarization direction. The display panel 111 may be a liquid crystal display panel, an organic light emitting diode display panel, an electronic paper display panel, or other type of display panel. In the embodiment that the display panel 111 is the liquid crystal display panel (as shown in FIG. 3), the display panel 111 not only includes the second polarization sheet 111a, but also includes a third polarization sheet 111b and a liquid crystal cell 111c. The liquid crystal cell 111c is disposed between the second polarization sheet 111a and the third polarization sheet 111b, and the second polarization sheet 111a is disposed between the liquid crystal cell 111c and the prism group 120 of FIG. 2. Moreover, the liquid crystal cell 111c may, for example, include an upper substrate, a lower substrate and a liquid crystal layer disposed between the upper substrate and the lower substrate, wherein the upper substrate may be a color filter substrate and the lower substrate may be a thin film transistor array substrate. The display module 110 may, for example, further include a backlight module 111d disposed below the third polarization sheet 111b for providing a backlight source.

Figure 4:
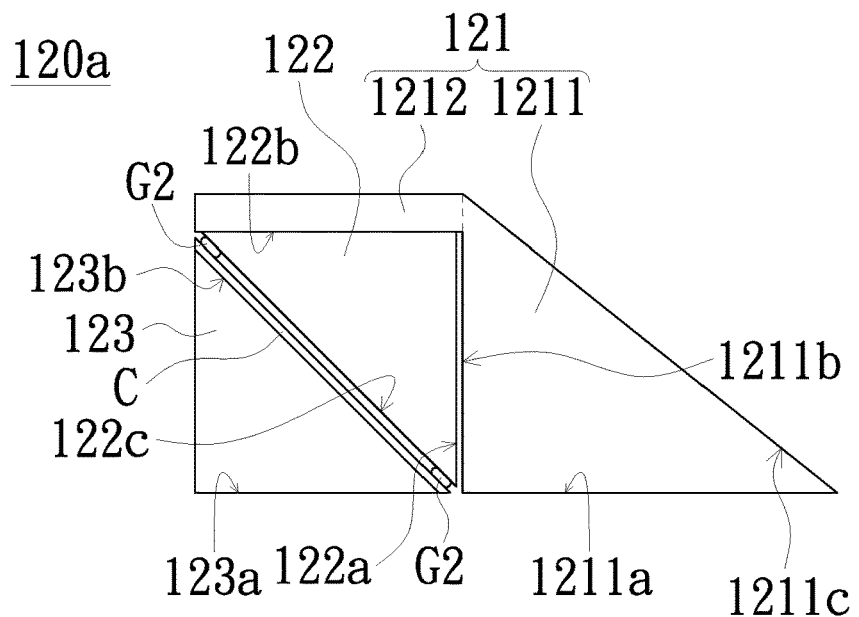
FIG. 4 is a schematic cross-sectional view of a prism group according to another embodiment of the invention.

FIG. 4 is a schematic cross-sectional view of a prism group according to another embodiment of the invention. Referring to FIG. 4, the prism group 120a of the embodiment is similar to the prism group 120 of FIG. 2, the main difference is that the second light emitting surface 122b of the second prism 122 of the embodiment is connected to the platform 1212 of the first prism 121. In the embodiment, there is a gap between the second light incident surface 122a of the second prism 122 and the first light emitting surface 1211b of the first prism 121. Thus, a portion of the image from the visible area A of the display module 110 (referring to FIG. 2) may be totally reflected by the first light emitting surface 1211b, so the user viewing at a big viewing angle from the side nearby the first prism 121 (i.e. viewing to the first inclined surface 1211c) still may see the image. In one embodiment, since the second light emitting surface 122b of the second prism 122 is connected to the platform 1212 of the first prism 121, the first prism 121 and the second prism 122 may be integrated into one piece.

Figure 5:
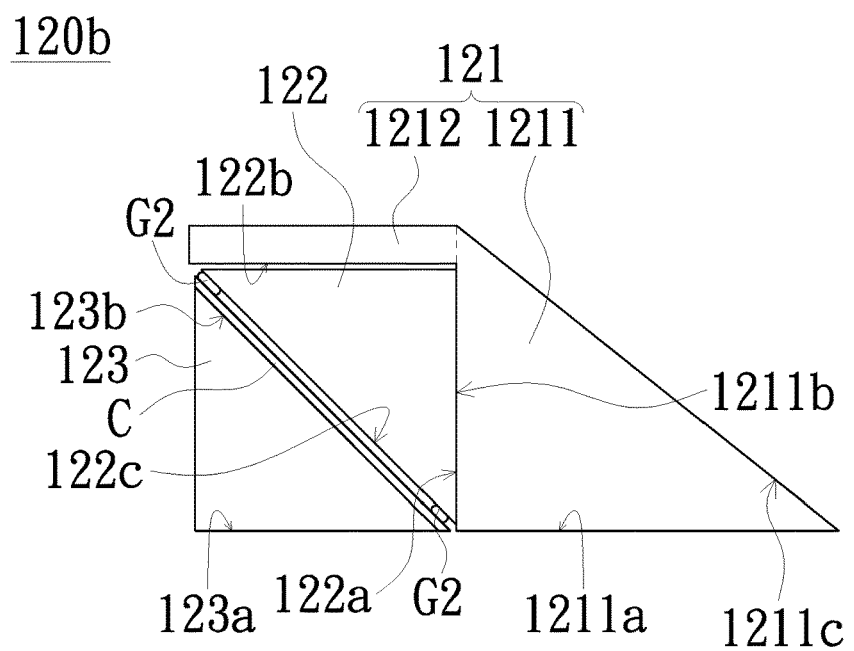
FIG. 5 is a schematic cross-sectional view of a prism group according to another embodiment of the invention.

FIG. 5 is a schematic cross-sectional view of a prism group according to another embodiment of the invention. Referring to FIG. 5, the prism group 120b of the embodiment is similar to the prism group 120 of FIG. 2, the main difference is that the second light incident surface 122a of the second prism 122 is connected to the first light emitting surface 1211b of the main body 1211 of the first prism 121. In one embodiment, since the second light incident surface 122a of the second prism 122 is connected to the first light emitting surface 1211b of the main body 1211 of the first prism 121, the first prism 121 and the second prism 122 may be integrated into one piece.

Figure 6:
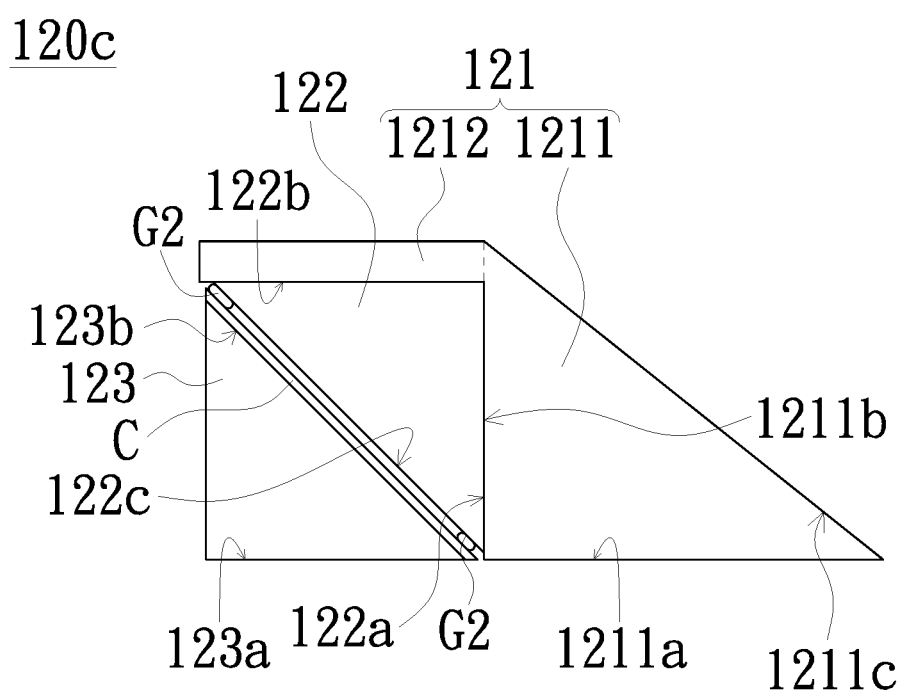
FIG. 6 is a schematic cross-sectional view of a prism group according to another embodiment of the invention.

FIG. 6 is a schematic cross-sectional view of a prism group according to another embodiment of the invention. Referring to FIG. 6, the prism group 120c of the embodiment is similar to the prism group 120 of FIG. 2, the main difference is that the second light emitting surface 122b of the second prism 122 of the embodiment is connected to the platform 1212 of the first prism 121, and the second light incident surface 122a of the second prism 122 is connected to the first light emitting surface 1211b of the main body 1211 of the first prism 121. In one embodiment, the first prism 121 and the second prism 122 may be integrated into one piece.

In summary, the display apparatus and the prism group of the embodiments of the invention have at least one of the following advantages. The prism group is disposed on at least one side of the display module and has the first prism and the second prism, wherein the first prism is disposed on the visible area of the display module, and the second prism is disposed between the non-visible area of the display module and the platform of the first prism. Due to this configuration, after the light rays from the visible area enter into the first prism, portions of the light rays are reflected from the first inclined surface to pass through the first light emitting surface of the first prism and the second light incident surface of the second prism, and then are reflected from the second inclined surface to pass through the second light emitting surface and the platform. Therefore, the light rays from the visible area of the display module may be guided to emit from the non-visible area by the prism group, so as to eliminate the non-visible area of the conventional display apparatus. Moreover, in one embodiment, since the protective cover is fixed to the platform of the first prism, the first prism may be firmly fixed to the display panel, and thus the protective cover is not easily fallen off.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first prism, the second prism, the third prism, the first light incident surface, the second light incident surface, the first light emitting surface, the second light emitting surface, the first inclined surface, the second inclined surface, the third inclined surface, the first polarization sheet, the second polarization sheet and the third polarization sheet are only used for distinguishing various elements and do not limit the number of the elements.

What is claimed is:

1. A display apparatus, comprising:
a display module, having a visible area and a non-visible area around the visible area; and
at least one prism group, disposed on at least one side of the display module and covering a portion of the visible area and a portion of the non-visible area, each the prism group comprising:
a first prism, disposed on the visible area, wherein the first prism has a main body and a platform connected to the main body, the main body has a first light incident surface, a first light emitting surface and a first inclined surface, the first light incident surface faces to the visible area and is connected the visible area, the first light emitting surface is connected to the first light incident surface and nearby the non-visible area, the first inclined surface is connected between the first light incident surface and the first light emitting surface, and the platform is opposite to the non-visible area and connected to the first light emitting surface; and
a second prism, disposed between the non-visible area and the platform, wherein the second prism has a second light incident surface, a second light emitting surface and a second inclined surface, the second light incident surface faces to the first light emitting surface, the second light emitting surface faces to the platform, and the second inclined surface is connected between the second light incident surface and the second light emitting surface.

2. The display apparatus according to claim 1, wherein each the prism group further comprises a third prism disposed between the non-visible area and the second inclined surface of the second prism, the third prism has a connection surface and a third inclined surface, the connection surface is connected to the non-visible area, and the third inclined surface inclined with respect to the connection surface is connected to the connection surface and opposite to the second inclined surface.

3. The display apparatus according to claim 2, wherein the third inclined surface has a reflective layer.

4. The display apparatus according to claim 2, wherein the display module comprises a display panel and a frame surrounding the display panel, and the connection surface of the third prism is connected to the frame.

5. The display apparatus according to claim 1, further comprising a protective cover connected to the platform and covering the platform and the visible area.

6. The display apparatus according to claim 5, further comprising a first polarization sheet covering the protective cover.

7. The display apparatus according to claim 6, wherein the display module comprises a display panel, the display panel comprises a second polarization sheet, and the second polarization sheet and the first polarization sheet have a same polarization direction.

8. The display apparatus according to claim 7, wherein the display panel is a liquid crystal display panel, the display panel further comprises a third polarization sheet and a liquid crystal cell, the liquid crystal cell is disposed between the second polarization sheet and the third polarization sheet, and the second polarization sheet is disposed between the liquid crystal cell and the at least one prism group.

9. The display apparatus according to claim 6, wherein the first polarization sheet is a glossy polarization sheet.

10. The display apparatus according to claim 1, wherein the first prism and the second prism are made of polymethylmethacrylate, polycarbonate or glass.

11. The display apparatus according to claim 1, further comprising a first optical clear adhesive layer adhered between the first light incident surface and the visible area.

12. The display apparatus according to claim 5, further comprising a second optical clear adhesive layer adhered between the platform and the protective cover.

13. The display apparatus according to claim 1, wherein the first prism and the second prism have a same refractive index.

14. A prism group, configured to be disposed on a side of a display module having a visible area and a non-visible area around the visible area to cover a portion of the visible area and a portion of the non-visible area, the prism group comprising:
a first prism, configured to be disposed on the visible area, wherein the first prism has a main body and a platform connected to the main body, the main body has a first light incident surface, a first light emitting surface and a first inclined surface, the first light incident surface faces to the visible area, the first light emitting surface is connected to the first light incident surface and nearby the non-visible area, the first inclined surface is connected between the first light incident surface and the first light emitting surface, the platform is opposite to the non-visible area and connected to the first light emitting surface; and
a second prism, configured to be disposed between the non-visible area and the platform, wherein the second prism has a second light incident surface, a second light emitting surface and a second inclined surface, the second light incident surface faces to the first light emitting surface, the second light emitting surface faces to the platform, the second inclined surface is connected between the second light incident surface and the second light emitting surface.

15. The prism group according to claim 14, further comprising a third prism configured to be disposed between the non-visible area and the second inclined surface of the second prism, the third prism has a connection surface and a third inclined surface, the connection surface is connected to the non-visible area, and the third inclined surface inclined with respect to the connection surface is connected to the connection surface and opposite to the second inclined surface.

16. The prism group according to claim 15, wherein the third inclined surface has a reflective layer.

17. The prism group according to claim 14, wherein the first prism and the second prism are made of polymethylmethacrylate, polycarbonate or glass.

18. The prism group according to claim 14, wherein the first prism and the second prism have a same refractive index.

\* \* \* \* \*